United States Patent
Kalsi et al.

(10) Patent No.: US 8,272,321 B1
(45) Date of Patent: Sep. 25, 2012

(54) ROTISSERIE FOR OVEN

(75) Inventors: Surya Kanwal Kalsi, Huntington Beach, CA (US); Rafael H. Romero, Downey, CA (US)

(73) Assignee: Capital Cooking Equipment, Inc., Santa Fe Springs, CA (US)

( * ) Notice: Subject to any disclaimer, the term of this patent is extended or adjusted under 35 U.S.C. 154(b) by 1200 days.

(21) Appl. No.: 12/027,177

(22) Filed: Feb. 6, 2008

Related U.S. Application Data

(60) Provisional application No. 61/015,196, filed on Dec. 20, 2007.

(51) Int. Cl.
*A47J 37/06* (2006.01)
*A47J 37/07* (2006.01)

(52) U.S. Cl. ............ 99/421 H; 99/421 HH; 99/421 HV; 99/419

(58) Field of Classification Search ............... 99/419, 99/421, 421 H, 421 HV, 421 HH, 421 V, 99/421 M, DIG. 14, 443 R; 74/385, 412 R, 74/416, 417
See application file for complete search history.

(56) References Cited

U.S. PATENT DOCUMENTS

| | | | | |
|---|---|---|---|---|
| 745,721 A | * | 12/1903 | Fetzer | 74/417 |
| 1,838,545 A | * | 12/1931 | Guffey | 99/421 P |
| 2,179,646 A | * | 11/1939 | Spartalis | 99/421 P |
| 2,821,905 A | * | 2/1958 | Culligan | 99/421 H |
| 3,026,400 A | * | 3/1962 | Van Sciver | 99/419 |
| 3,108,532 A | * | 10/1963 | Ray et al. | 99/421 R |
| 3,194,149 A | * | 7/1965 | Schibley | 99/421 HH |
| 3,221,638 A | * | 12/1965 | Wickenberg | 99/340 |
| 3,333,531 A | * | 8/1967 | Reuther | 99/339 |
| 3,380,377 A | * | 4/1968 | Alexander | 99/423 |
| 3,503,323 A | * | 3/1970 | Swetlitz | 99/352 |
| 3,583,307 A | * | 6/1971 | Lee, Sr. | 99/333 |
| 3,874,278 A | * | 4/1975 | Groce | 99/421 H |
| 4,131,778 A | * | 12/1978 | Tanaka et al. | 219/754 |
| 4,219,715 A | * | 8/1980 | Mandle et al. | 219/755 |
| 4,286,133 A | * | 8/1981 | Einset et al. | 219/753 |
| 4,572,216 A | * | 2/1986 | Josuttis et al. | 131/70 |
| 4,636,605 A | * | 1/1987 | Berend et al. | 219/755 |
| 4,717,802 A | * | 1/1988 | Colato | 219/755 |
| 4,985,607 A | * | 1/1991 | Oya | 219/752 |
| 5,056,938 A | * | 10/1991 | Ahlman et al. | 384/286 |
| 5,205,207 A | | 4/1993 | McGuire | |
| 5,445,065 A | | 8/1995 | Lopata | |

(Continued)

FOREIGN PATENT DOCUMENTS

WO WO2005/064255 * 7/2005

*Primary Examiner* — Gene Kim
*Assistant Examiner* — John E Simms, Jr.
(74) *Attorney, Agent, or Firm* — Jerry Turner Sewell

(57) ABSTRACT

A removable rotisserie accessory for an oven includes a motor assembly positionable beneath a floor of the oven to provide rotational energy about a vertical axis perpendicular to the floor of the oven. A vertical rod is insertable through an opening in the floor of the oven to engage the motor assembly and to rotate about the vertical axis. A horizontal rod has a first end supported by the vertical rod and has a second end supported proximate to a sidewall of the oven. The horizontal rod supports at least one engagement device for an item to be cooked. A miter gear assembly includes a first bevel gear mounted on the vertical rod to rotate with the vertical rod and includes a second bevel gear mounted on the horizontal rod to rotate the horizontal rod in response to rotation of the first bevel gear.

7 Claims, 10 Drawing Sheets

U.S. PATENT DOCUMENTS

| | | | |
|---|---|---|---|
| 5,533,440 A | 7/1996 | Sher | |
| 5,539,184 A * | 7/1996 | Su | 219/388 |
| 5,575,196 A * | 11/1996 | Masel et al. | 99/421 V |
| 5,586,490 A * | 12/1996 | Saman | 99/421 R |
| 5,660,101 A * | 8/1997 | Cirigliano | 99/395 |
| 5,715,744 A | 2/1998 | Coutant | |
| 5,720,217 A | 2/1998 | Pappas | |
| 5,837,980 A * | 11/1998 | Henning | 219/753 |
| 5,845,563 A * | 12/1998 | Haring et al. | 99/419 |
| 5,908,576 A * | 6/1999 | Henning | 219/753 |
| 6,041,694 A * | 3/2000 | Hsu | 99/427 |
| 6,047,633 A * | 4/2000 | Khaytman | 99/421 V |
| 6,265,697 B1 * | 7/2001 | Sen | 219/392 |
| 6,330,851 B1 * | 12/2001 | Riesselmann | 99/339 |
| 6,363,836 B1 * | 4/2002 | Usherovich | 99/339 |
| 6,418,835 B1 * | 7/2002 | Lin | 99/421 H |
| 6,509,549 B1 * | 1/2003 | Chasen et al. | 219/386 |
| 6,651,286 B2 * | 11/2003 | Pierce | 15/98 |
| 6,998,593 B2 * | 2/2006 | Lee | 219/752 |
| 7,317,173 B2 * | 1/2008 | Bartelick et al. | 219/401 |
| 2003/0222073 A1 * | 12/2003 | Moon et al. | 219/404 |
| 2003/0230200 A1 | 12/2003 | Cheung | |
| 2004/0011217 A1 | 1/2004 | Marson | |
| 2004/0055477 A1 | 3/2004 | Swank et al. | |
| 2004/0182254 A1 | 9/2004 | Gershon | |
| 2005/0056633 A1 * | 3/2005 | Backus et al. | 219/392 |
| 2005/0178275 A1 | 8/2005 | Backus et al. | |
| 2005/0268794 A1 | 12/2005 | Nesterov | |
| 2006/0144247 A1 * | 7/2006 | Umit et al. | 99/419 |
| 2009/0205512 A1 * | 8/2009 | Carpenter et al. | 99/421 V |
| 2010/0018413 A1 * | 1/2010 | Thomas | 99/421 HV |
| 2010/0199855 A1 * | 8/2010 | Georgis | 99/421 V |
| 2010/0270282 A1 * | 10/2010 | Fernandez et al. | 219/392 |

* cited by examiner

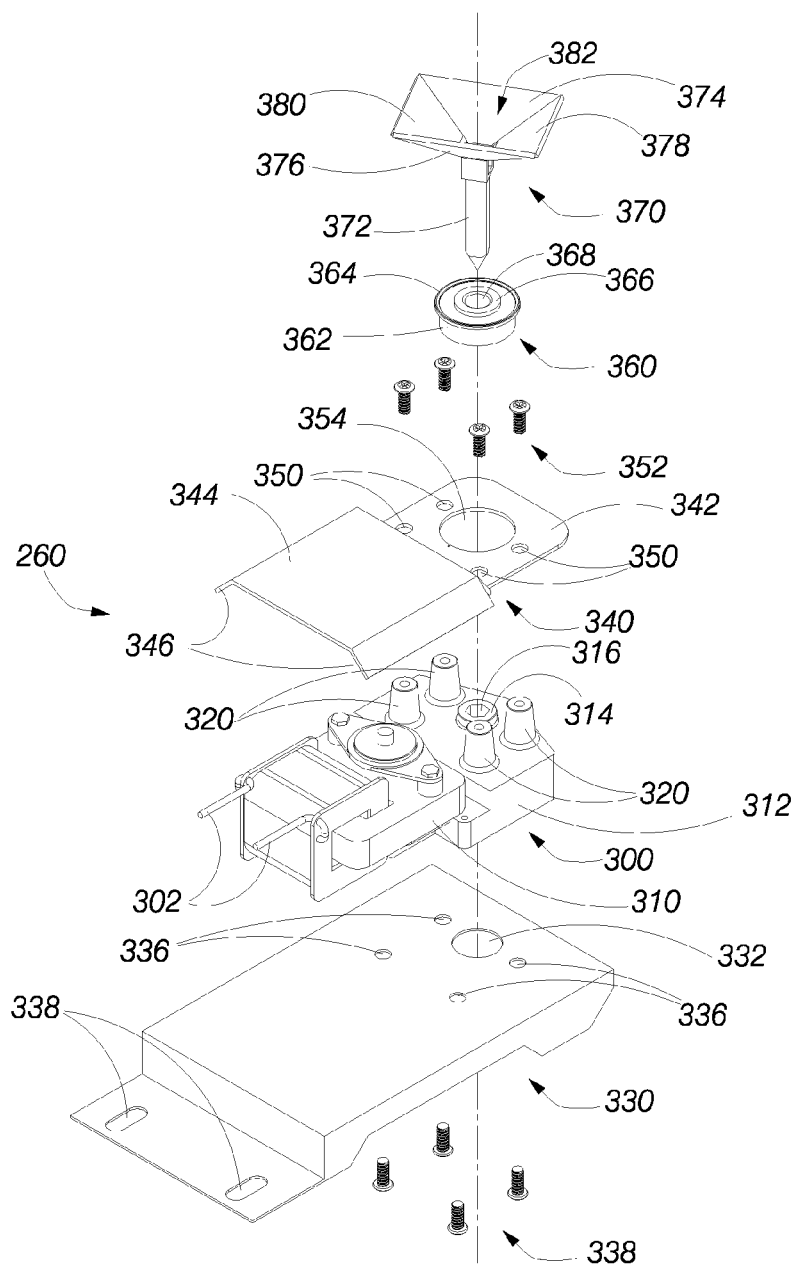
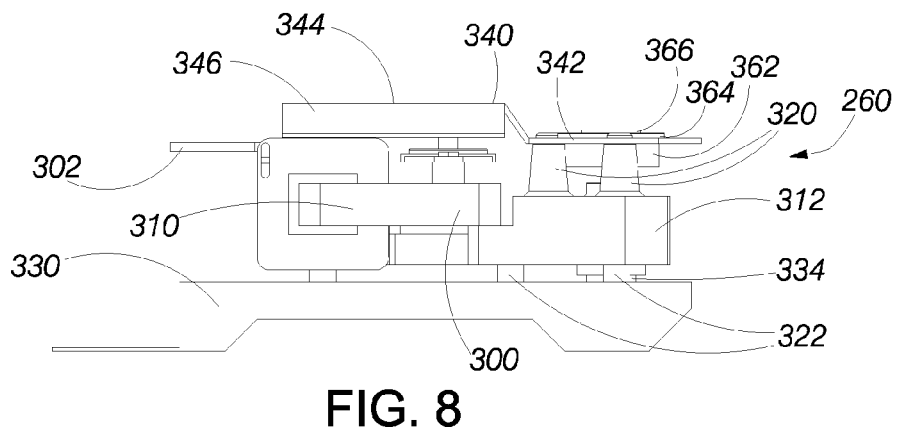
FIG. 7
FIG. 8

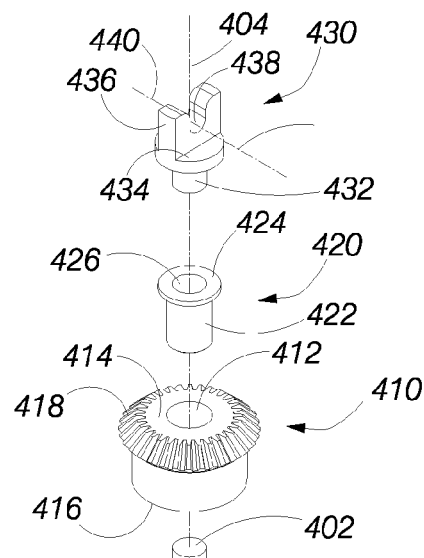
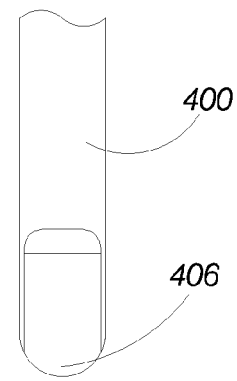
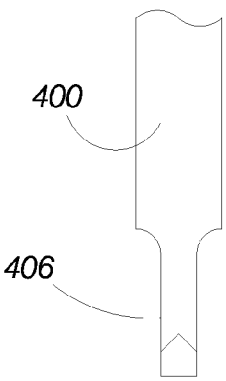
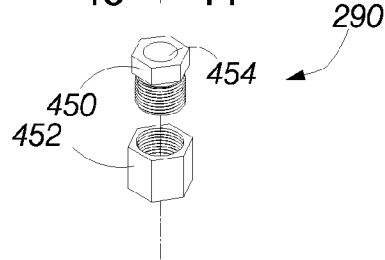
FIG. 13  FIG. 12  FIG. 14

ROTISSERIE FOR OVEN

BACKGROUND OF THE INVENTION

1. Field of the Invention

The present invention is generally in the field of cooking appliances, and, more particularly, is in the field of rotisseries for built-in ovens and for other ovens having limited horizontal dimensions.

2. Description of the Related Art

A rotisserie is a cooking system in which meat skewered on a spit is rotated over or proximate to a flame or other heat source to cook the meat evenly in its own juices. All sides of the meat may be accessed to add basting as needed while the meat is cooking.

Rotisseries are available as stand-alone appliances. Because stand-alone rotisseries require storage space when not in use, many cooks choose to add a rotisserie to an existing grill or oven as a removable accessory. When the rotisserie is not being used, the rotisserie is removed, cleaned and stored. Typically, a rotisserie is turned by a small electric motor or other source of rotational power. In a typical rotisserie having a horizontal spit, the motor is located on the outside of one sidewall of the grill or oven enclosure so that the motor is not subjected to the heat within the grill or oven enclosure. When the spit is inserted in the grill or oven enclosure, an extended portion of the spit passes through an opening in the side of the grill or the side of the oven and engages the motor.

Although accessory rotisseries are available for grills and for some ovens in free-standing ranges (oven/cooktop combinations), such rotisseries are not available for built-in ovens (e.g., ovens configured to fit into kitchen cabinetry) or for most free-standing ranges. Built-in ovens generally have a form factor selected to provide the maximum width of the inner dimensions of the oven enclosure for a given cabinet width. Accordingly, little or no space is available to position a typical rotisserie motor between the outer sidewall of the oven enclosure and the inside wall of the kitchen cabinet. Reducing the inner dimensions of the oven cavity is not an option in most cases since ovens with smaller inside dimensions are not well-received by consumers. Increasing the cabinet width is also not an option in most cases since kitchen cabinets are generally available in a limited number of conventional widths. Although a custom cabinet could be constructed to accommodate the external motor, the resulting cabinet with a considerably larger border alongside the oven enclosure would not be aesthetically acceptable. In some cases, additional space is not available for wider cabinets. A similar issue arises for ovens in free-standing ranges since the additional width required for the side-mounted rotisserie motor either increases the width of the free-standing range or reduces the width of the oven cavity in the free-standing range.

SUMMARY OF THE INVENTION

In view of the foregoing, a need exists for a rotisserie accessory that can be selectively installed in and removed from an oven enclosure without requiring a motor positioned outside an oven sidewall and without reducing the width and overall volume of the oven enclosure.

An aspect of embodiments in accordance with the present invention is a rotisserie accessory for an oven that includes a horizontal spit. The horizontal spit is supported at a first one end by a fixed bracket attached to the inside of one wall of the oven enclosure. The horizontal spit is supported at an opposite second end by a floating support bracket that receives the second end of the horizontal spit. The floating support bracket rests on top of a vertical drive rod that rotates about a vertical axis. Although resting on the vertical drive rod, the floating support bracket does not rotate. A first gear fixed to the vertical drive rod rotates with the vertical drive rod. A second gear fixed to the horizontal spit engages the first gear and causes the horizontal spit to rotate about a horizontal axis generally perpendicular to the vertical axis. The lower end of the vertical rod extends through an opening in the floor of the oven enclosure and is removably coupled to an electric motor positioned beneath the floor of the oven. Accordingly, when electric power is applied to the electric motor, the vertical rod rotates about the vertical axis and the rotation of the vertical rod is coupled to the horizontal rod via the first gear and the second gear to rotate the spit about the horizontal axis. After use, the horizontal spit is easily removed from the fixed bracket and the floating support bracket. The vertical rod is easily disengaged from the electric motor so that the oven enclosure is available for use as a conventional oven unencumbered by the elements of the rotisserie accessory.

In particularly preferred embodiments, the electric motor beneath the oven floor is coupled to lower end of the vertical rod via a funnel-like coupler. The funnel-like coupler has an enlarged upper open portion greater than the outer dimensions of the lower end of the vertical rod and has a smaller lower restraining portion that receives and restrains the lower end of the vertical rod. The funnel-like coupler includes a transition portion between the upper open portion and the lower restraining portion. When the vertical rod is passed through the opening in the floor of the oven enclosure, the lower end of the vertical rod enters the open upper portion of the funnel-like coupler and is guided to the lower restraining portion by the transition portion. The combination of the fixed opening in the floor of the oven enclosure and the enlarged open portion of the funnel-like coupler substantially assure that the lower end of the vertical rod will be properly positioned to engage the lower restraining portion so that the vertical rod rotates when power is applied to the electric motor.

BRIEF DESCRIPTION OF THE DRAWINGS

The foregoing aspects and other aspects of this disclosure are described in detail below in connection with the accompanying drawing figures in which:

FIG. 7 illustrates an exploded perspective view of the motor assembly of FIGS. 4, 5 and 6;

FIG. 8 illustrates a side elevational view of the assembled motor of FIG. 4;

FIG. 12 illustrates an exploded perspective view of the vertical rod assembly of the rotisserie accessory of FIGS. 5 and 6, including the floor bushing assembly;

FIG. 13 illustrates an enlarged elevational view of the lower end of the vertical rod of FIG. 12 in the direction of the arrows 13-13 in FIG. 12 to show the curved lower end of the vertical rod;

FIG. 14 illustrates an enlarged elevational view of the lower end of the vertical rod of FIG. 12 in the direction of the arrows 14-14 in FIG. 12 to show the flattening of the lower end of the vertical rod to fit into the lower restraining portion of the rod receiving funnel assembly of FIGS. 9-11;

DETAILED DESCRIPTION OF A PREFERRED EMBODIMENT

Figure 1:
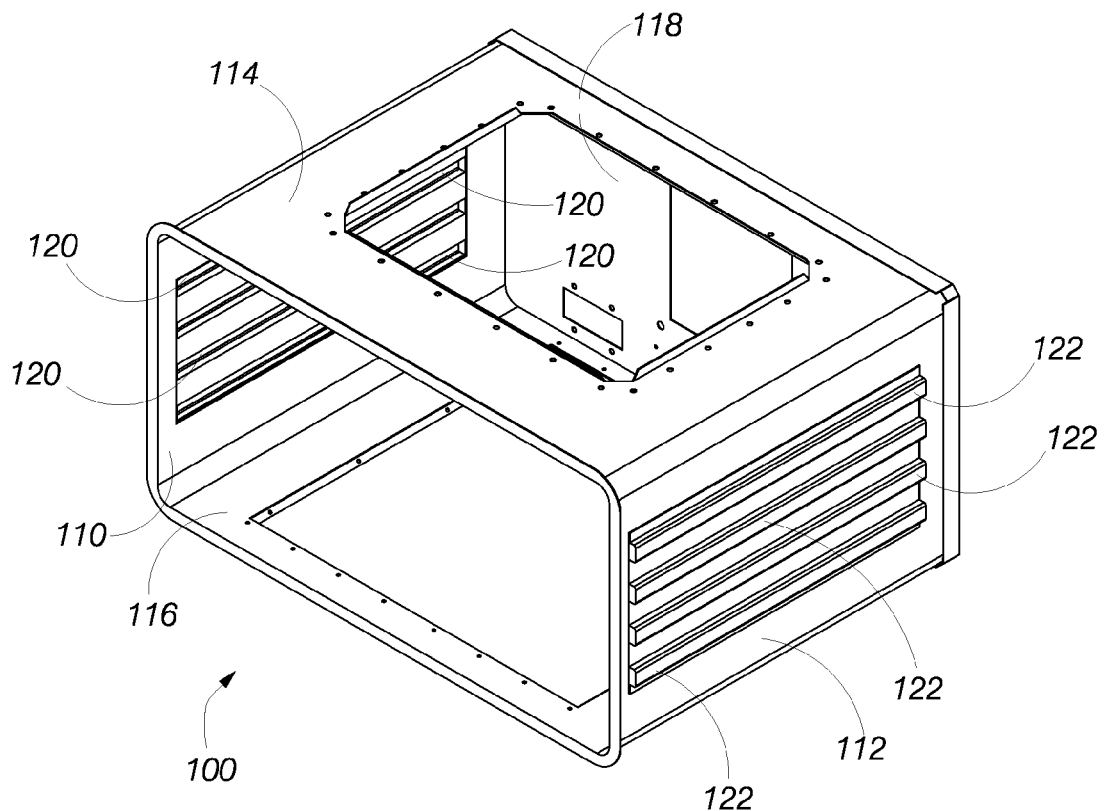
FIG. 1 illustrates a perspective view of an oven cavity into which the rotisserie accessory may be incorporated.
Figure 2:
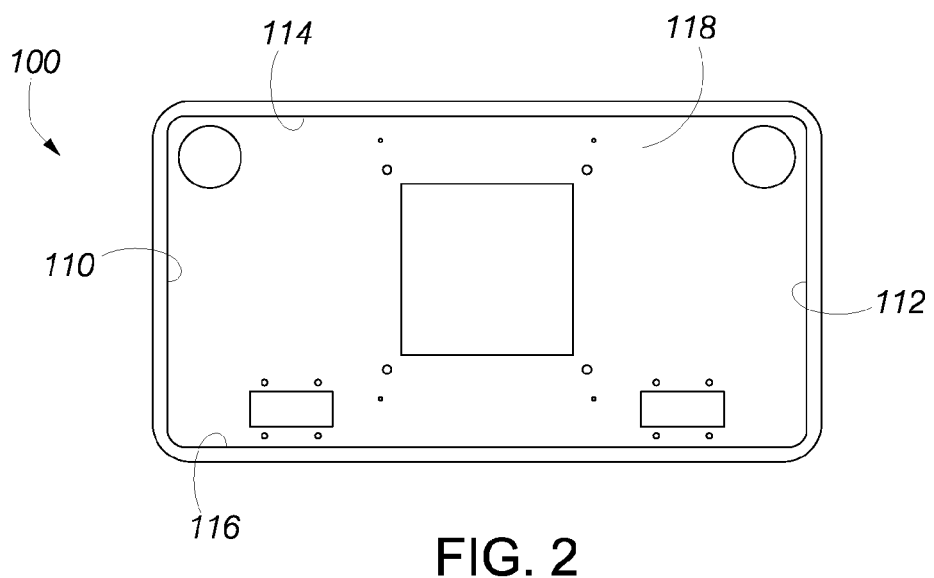
FIG. 2 illustrates a front elevational view of the oven cavity of FIG. 1.

FIG. 1 illustrates a perspective view and FIG. 2 illustrates a front elevational cross-sectional view of an exemplary oven cavity 100 for use with an exemplary built-in oven. The oven cavity can also be used in a stand-alone oven or as the oven portion of a free-standing range. The oven cavity is modifiable as described below to provide an environment for a rotisserie in accordance with an embodiment of the present invention.

As illustrated, the oven cavity 100 includes a left sidewall 110, a right sidewall 112, an upper wall (or top) 114, a floor (or lower wall) 116 and a back wall 118. A plurality of left horizontal slots 120 are formed as depressed grooves with respect to the inner surface of the left sidewall. A corresponding plurality of right horizontal slots 122 are positioned with respect to the inner surface of the right sidewall. The protruding outer walls of the right horizontal slots are shown in FIG. 1. The horizontal slots on the opposite sidewalls of the oven cavity are aligned and are positioned to receive one or more removable oven racks (not shown) to enable the oven incorporating the oven cavity to be use for conventional roasting and baking of food products positioned on the oven racks. For example, in the illustrated embodiment of the oven cavity, four slots are provided on each sidewall to enable the oven racks to be positioned at four different levels.

Only the basic oven cavity 100 is shown in FIGS. 1 and 2. One skilled in the art will appreciate that a completed oven will include additional structures (not shown), such as, for example, the oven door, upper and lower heating elements (gas or electric or both) to heat the oven, controls, lighting, insulation, and the like. A plurality of openings shown in the upper wall 114, the lower wall 116 and the back wall 118 accommodate the additional structures.

Figure 3:
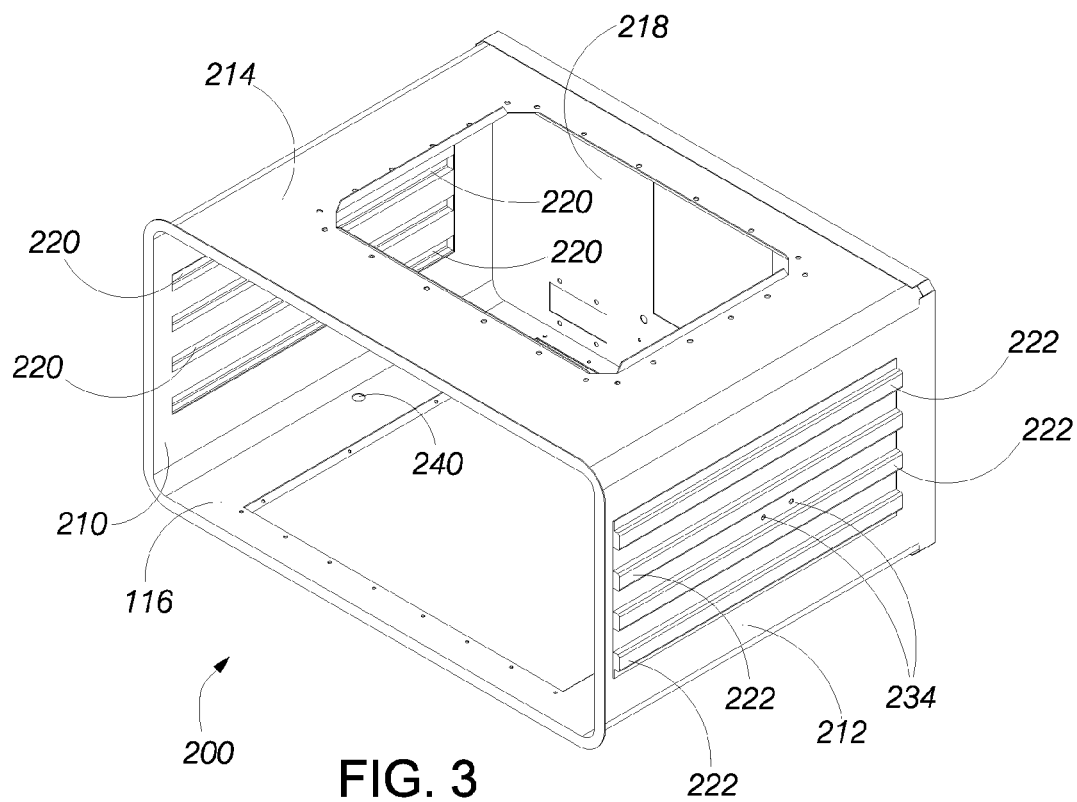
FIG. 3 illustrates a perspective view of an oven cavity similar to the oven cavity of FIG. 1 as modified to accommodate the rotisserie accessory.
Figure 4:
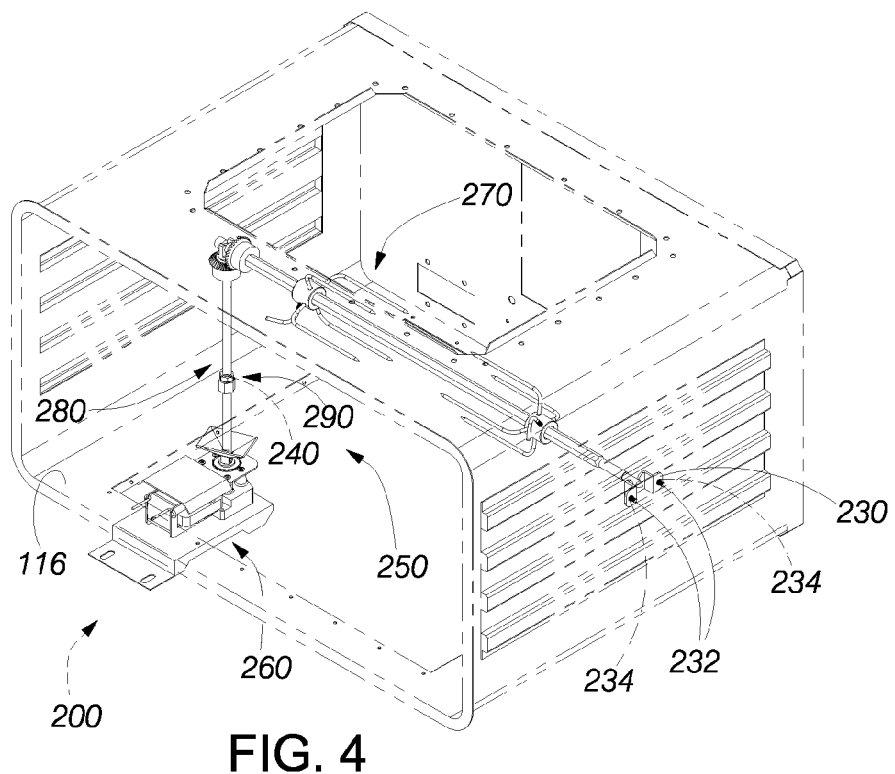
FIG. 4 illustrates a perspective view of the oven cavity of FIG. 3 with the rotisserie accessory installed, wherein the oven cavity is shown in phantom lines to show the entire rotisserie assembly.

FIGS. 3 and 4 illustrate an oven cavity 200 that is modified from the oven cavity 100 to accommodate the removable rotisserie system described herein. The modified oven cavity includes a left sidewall 210, a right sidewall 212, an upper wall (or top) 214, a floor (lower wall) 216 and a back wall 218, which correspond to the structures described above for the unmodified oven cavity. The modified oven cavity further includes a plurality of left horizontal slots 220 and a plurality of right horizontal slots 222, also as described above. The modified oven cavity includes an end support bracket 230 (shown in FIG. 4) positioned on the inner surface of the right sidewall between two of the right horizontal slots. The end support bracket is positioned approximately at the center or the right inner sidewall such that the end support bracket is approximately midway between the front and the back of the oven cavity. The end support bracket is approximately midway between the top and the floor of the oven cavity. The end support bracket is secured to the right sidewall by a pair of mounting screws 232 that engage a pair of holes mounting holes 234 formed in the right sidewall via a pair of mounting holes 236 (shown in FIG. 17) in the end support bracket.

The modified oven cavity 200 further includes a hole 240 formed in the floor 216. The hole is formed proximate the left sidewall 210 approximately 1.4 inches from the left sidewall. The hole is positioned approximately midway between the front and the back of the oven cavity. More particularly, the center of the hole is substantially the same distance from the front of the oven cavity as the midpoint of the end support bracket 230 so that the center of the hole and the midpoint of the end support bracket or in a common vertical plane (not shown) parallel to a vertical plane (not shown) defined by the front of the oven cavity.

As illustrated in FIG. 4, a rotisserie accessory 250 is positioned in the oven cavity 200 and is held in an operational alignment in the oven cavity by the end support bracket 230 on the right sidewall 212 and by the hole 240 in the floor 216. The rotisserie accessory is driven by a motor assembly 260 that is positioned beneath the floor of the oven cavity. In the illustrated embodiment, the motor assembly is secured to the cabinetry (not shown) for a built-in oven or secured to the frame (not shown) of a standalone oven or a free-standing range (e.g., an oven/cooktop combination).

Figure 5:
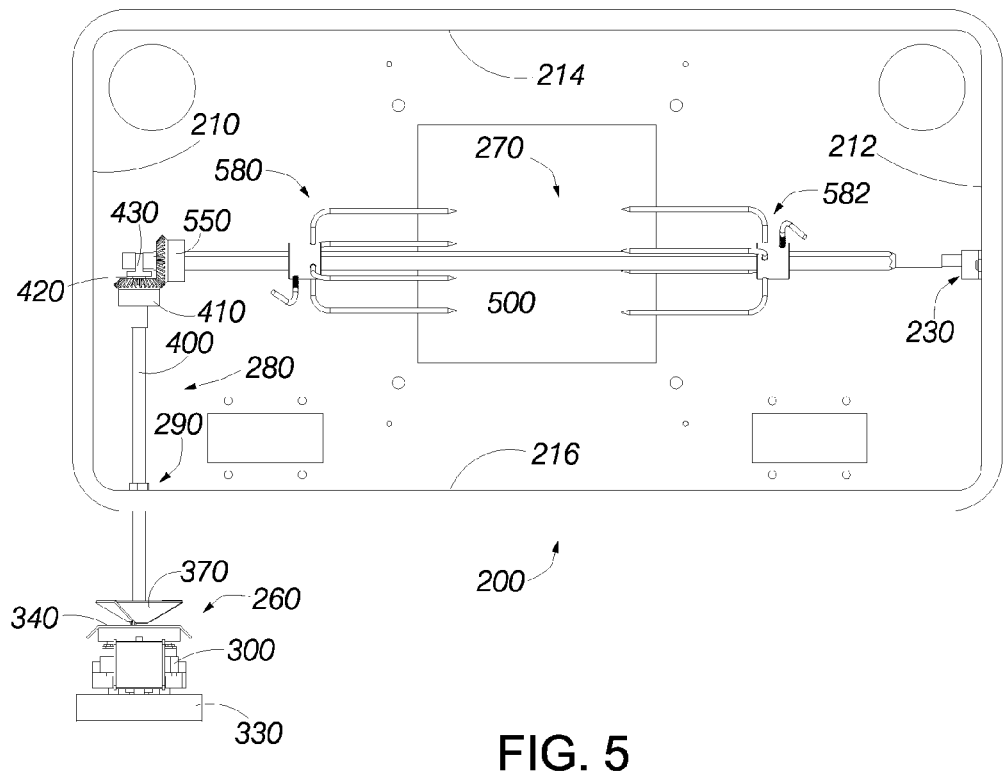
FIG. 5 illustrates a front elevational view of the oven cavity of FIG. 4 showing the motor assembly positioned below the floor of the oven cavity, the vertical rod assembly passing through the floor bushing and engaging the motor assembly, and the horizontal rod assembly positioned in the oven cavity and supported and driven by the vertical rod assembly.
Figure 6:
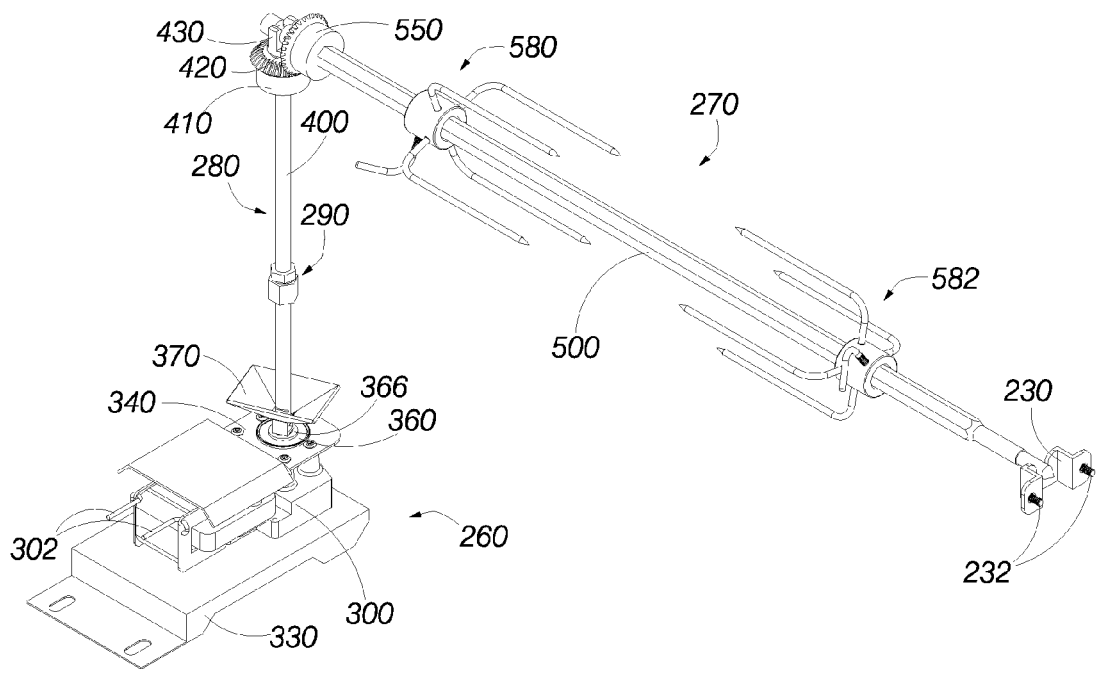
FIG. 6 illustrates an enlarged perspective view of the rotisserie accessory of FIG. 4.

As shown in more detail in FIGS. 5 and 6, the rotisserie accessory 250 includes a horizontal rod assembly 270 and a vertical rod assembly 280, which are described in more detail below. The right end of the horizontal rod assembly rests in the end support bracket 230. The left end of the horizontal rod assembly is supported by the vertical rod assembly, as described in more detail below. The vertical rod assembly is maintained in alignment with the motor assembly by a floor bushing assembly 290, which is positioned in the hole 240 in the floor 216 of the oven cavity 200.

As shown in more detail in the exploded perspective view in FIG. 7 and in the side elevational view of FIG. 8, the motor assembly 260 comprises an electric gearmotor 300, which is preferably driven by the AC electrical power available in a residence or commercial building. The electric gearmotor is coupled to the AC power by conventional conductors 302 and is controlled by a switch (not shown) that is preferably mounted on the control panel (not shown) of the oven.

In the illustrated embodiment, the electric gearmotor 300 includes a motor portion 310 and a gear drive 312. The gear drive is coupled to the motor portion. The gear drive provides rotational power at an output shaft 314 at a rotational velocity of approximately 6 revolutions per minute (rpm). In the illustrated embodiment, the output shaft has a hexagonal central bore 316 having a cross-sectional dimension between opposite inner faces of approximately 5/16 inch (0.3125 inch).

In the illustrated embodiment, the electric gearmotor 300 is a 120-volt, 0.48-ampere, Gearmotor Model No. 782-030506-999 commercially available from McMillan Motors. The electric gearmotor provides 40 pound-inches of torque at 6 rpm at the output shaft 314. The electric gearmotor 300 has a low profile with a height of approximately 2.125 inches between a set of upper standoffs 320 and a set of lower standoffs 322 (shown in FIG. 8). Other low-profile rotisserie motors available from other sources may also be used.

The electric gearmotor 300 rests on a motor support bracket 330. In the illustrated embodiment, the motor support bracket comprises 18 gauge galvanized aluminum that is cut and formed into the shape shown in FIGS. 7 and 8. The motor support bracket includes a central circular opening 332 that receives a lower extended portion 334 (shown in FIG. 8) of the output shaft 314 of the electric gearmotor. The motor support bracket further includes a plurality of motor mounting holes 336 that are aligned with the lower standoffs 322 of the electric gearmotor. A corresponding plurality of screws 338 (e.g., four 8-32 UNC screws) pass through the motor mounting holes and engage the lower standoffs to secure the electric gearmotor to the motor support bracket.

Two bracket mounting holes 338 at one end of the motor support bracket 330 are used to secure the motor support bracket to the cabinetry (not shown) for a built-in oven or to secure the motor support bracket to the frame of a stand-alone oven or a free-standing range. For example, a pair of screws (not shown) may pass through the bracket mounting holes to secure the motor support bracket to wooden cabinetry. Alternatively, screws or bolts (not shown) may be used to secure the motor support bracket to the metal frame of a stand-alone oven or a free-standing range. The motor support bracket is positioned and secured so that the central circular opening 332 is aligned with the hole 240 in the floor 216 of the oven cavity 200 when the oven cavity is positioned in the cabinetry or frame so that the output shaft 314 is aligned with the hole in the floor.

As further shown in FIGS. 7 and 8, a bearing support bracket 340 is mounted over the electric gearmotor 300. In the illustrated embodiment, the bearing support bracket comprises 14 gauge galvanized aluminum that is cut and formed into the shape shown in FIGS. 7 and 8. The bearing support bracket comprises a mounting portion 342 and a motor shield portion 344. The mounting portion of the bearing support bracket generally extends over the gear drive 312 of the electric gearmotor. The motor shield portion generally extends over the motor portion 310 of the electric gearmotor. In the illustrated embodiment, the motor shield portion is raised to a higher elevation with respect to the mounting portion to accommodate the increased height of the motor portion of the particular gearmotor incorporated into the preferred embodiment. The motor shield portion advantageously includes a pair of angled flanges 346 that extend downwardly alongside the motor portion. The motor shield portion functions as a thermal shield to reduce the amount of heat transferred from the floor 216 of the oven cavity 200 to the motor portion of the electric gearmotor.

The mounting portion 342 of the bearing support bracket 340 includes a plurality of mounting holes 350 that are aligned with the upper standoffs 320 of the electric gearmotor 300. A corresponding plurality of screws 352 (e.g., four 8-32 UNC screws) pass through the mounting holes and engage the upper standoffs to secure the bearing support bracket to the electric gearmotor.

The mounting portion 342 of the bearing support bracket 340 includes a circular opening 354 that is concentric to the output shaft 304 of the electric gearmotor 300 when the bearing support bracket is secured to the electric gearmotor. The circular opening has a diameter of approximately 1.125 inches. The circular opening is sized to receive the outer diameter of the main cylindrical body 362 of a flanged ball bearing 360. In particular, the main cylindrical body of the flanged ball bearing has an outer diameter of approximately 1.126 inches so that the flanged ball bearing can be pressed into the circular opening and secured tightly therein. The flanged ball bearing has a flange 364 that has an outer diameter of approximately 1.25 inches. The flange rests on the upper surface of the mounting portion 342 of the bearing support. The flanged ball bearing has a rotating inner bearing race 366 that has an outer diameter of approximately 3/4 inch. The inner bearing race has an inner circular bore 368 that has a diameter of approximately 3/8 inch. In the illustrated embodiment, the flanged ball bearing is an HW-11A flanged ball bearing commercially available from Eureka Bearings of Huntington Beach, Calif. Other bearings may also be used with suitable modifications to the size of the circular opening in the bearing support, if needed.

The inner circular bore 368 of the flanged ball bearing 360 is positioned to receive an extended post portion 372 of a rod-receiving funnel 370. The rod-receiving funnel is shown in more detail in FIGS. 9, 10 and 11. The rod-receiving funnel has a generally rectangular shape when viewed from above and comprises a first panel 374, a second panel 376, a third panel 378 and a fourth panel 380. The four panels advantageously comprise 14 gauge stainless steel formed into trapezoidal shapes. The four panels are interconnected along the respective sloped sides of the trapezoidal shapes by welding or by another suitable interconnection method. The first panel and the second panel are disposed on opposite sides of the rod-receiving funnel and are interconnected by the third panel and the fourth panel. The four trapezoidal panels are positioned with the respective longer bases of the trapezoidal shapes at the top to form a generally rectangular upper opening 382 of the rod-receiving funnel. In the illustrated embodiment, the bases of the first panel and the second panel have lengths of approximately 2.158 inches, and the bases of the third panel and the fourth panel have lengths of approximately 1.55 inches. The sloped sides of the trapezoidal shapes are disposed at respective angles of approximately 45 degrees with respect to the respective bases.

Figure 9:
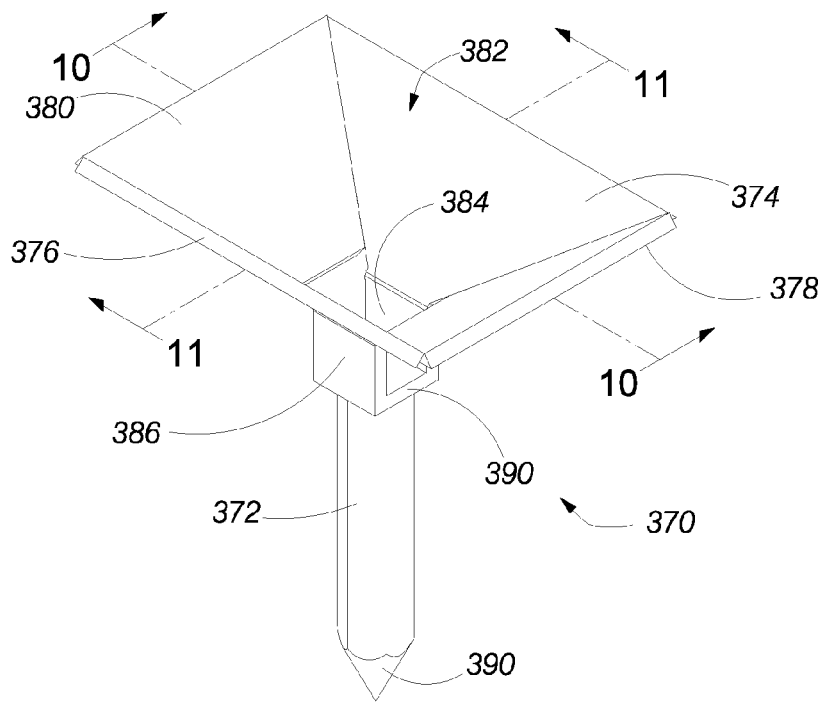
FIG. 9 illustrates an enlarged perspective view of the vertical rod receiving funnel of FIG. 7.
Figure 11:
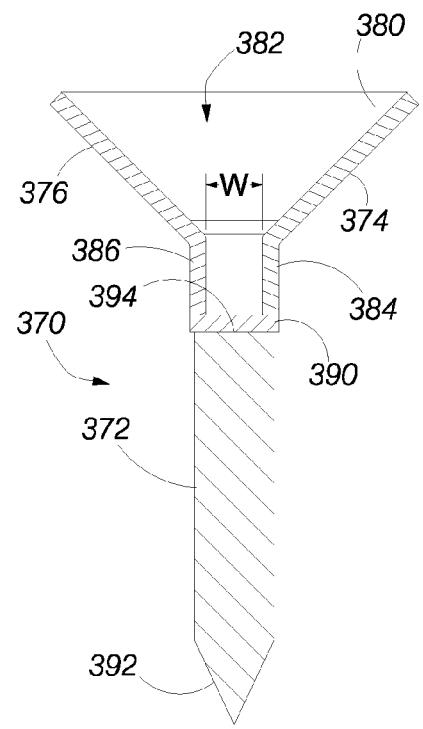
FIG. 11 illustrates a cross-sectional elevational view of the vertical rod receiving funnel of FIG. 9 taken along the lines 11-11 in FIG. 9.

The first panel 374 and the second panel 376 of the rod-receiving funnel 370 have respective shorter sides opposite the respective base sides. Each shorter side is disposed approximately 0.884 inch from the respective base side to define the height of the respective panel (the height being defined as the distance along the plane of the panel). Each shorter side has a width of approximately 0.39 inch. The first panel includes a first extended tab 384 that extends downward from the shorter side for approximately 0.35 inch at an angle of approximately 45 degrees so that the first extended tab is generally perpendicular to the plane of the rectangular upper opening 382 of the rod-receiving funnel. The second panel includes a second extended tab 386 that extends downward from the shorter side for approximately 0.35 inch at an angle of approximately 45 degrees so that the second extended tab is generally perpendicular to the plane of the rectangular upper opening 382 of the rod-receiving funnel and is parallel to the first extended tab, as shown in FIGS. 9 and 11.

The third panel 378 and the fourth panel 380 of the rod-receiving funnel 370 have respective shorter sides opposite the respective base sides. Each shorter side is disposed approximately 1 inch from the respective base side, which defines the height of the respective panel Each shorter side has a width of approximately 0.312 inch.

Figure 10:
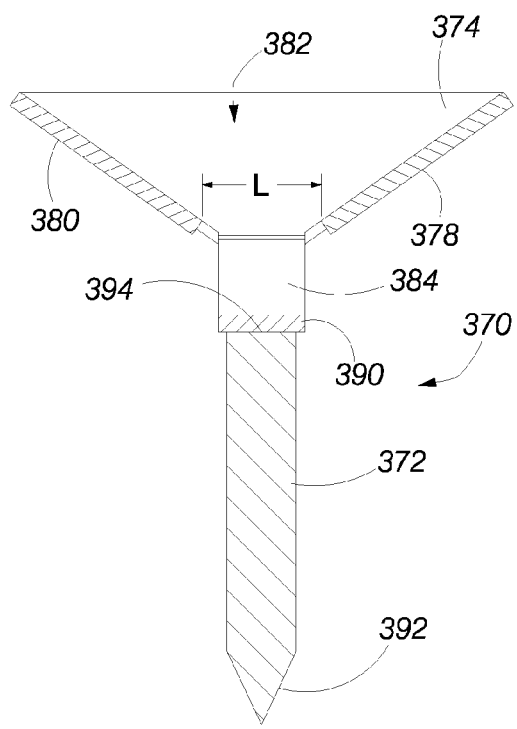
FIG. 10 illustrates a cross-sectional elevational view of the vertical rod receiving funnel of FIG. 9 taken along the lines 10-10 in FIG. 9.

When the four panels 374, 376, 378, 380 are interconnected along the sloped sides of the trapezoidal shape, the facing surfaces of the first extended tab 384 and the second extended tab 386 are spaced approximately 0.25 inch apart below the funnel-shaped structure formed by the four panels. As shown in FIGS. 9-11, a generally horizontal rectangular cross piece 390 interconnects the lower ends of the two extended tabs. In the preferred embodiment, the cross piece also comprises 14 gauge stainless steel. The two extended tabs and the cross piece form a generally U-shaped channel below the four panels, which has a width W defined by the 0.25-inch width between the two tabs. As shown in FIG. 10, the heights of the third panel and the fourth panel are selected so that the sloped sides of the third panel and fourth panel do not extend for the full lengths of the sloped sides of the first panel and the second panel. Thus, the lower opening of the rectangular funnel-like structure has a length L between the ends of the third panel and the fourth panel of approximately 0.53 inch.

The extended post portion 372 preferably comprises a stainless steel rod that has a generally hexagonally shaped cross section. The extended post portion has a size of slightly less than approximately $5/16$ inch (0.3125 inch) between opposite flat faces of hexagonal cross section. In particular, the cross-sectional dimensions of the extended post portion are selected to be slightly less than the inner dimensions of the central bore 316 of the output shaft 314 of the electric gearmotor 300 so that the extended post portion fits snugly in the central bore. The extended post portion has a size of approximately 0.36 inch between opposite vertices of the hexagonal shape so that the extended post portion fits through inner circular bore 368 of the inner bearing race 366 of the flanged ball bearing 360. The extended post portion has a lower end 392 that is tapered to form a cone-shaped tip so that the extended post self-centers into the central bore of the output shaft of the electric gearmotor after passing through the inner circular bore of the flanged ball bearing.

The extended post portion 372 has an upper end 394 that is generally flat. The upper end of the extended post portion provides a generally horizontal platform that is connected to the lower surface of the crosspiece generally U-shaped channel formed by the first extended tab 384, the second extended tab 386 and the cross piece 388, as described above. The bottom of the U-shaped channel is secured to the upper end of the extended post portion by welding or in another suitable manner. The extended post portion has a height of approximately 1.77 inches from the lower end 392 to the upper end.

The extended post portion 372 is inserted through the central bore 368 of the flanged bearing 360 and into the central bore 316 of the output shaft 314 of the gear drive 312 of the electric gearmotor 300. The planar faces and vertices of the extended post portion engage the planar faces and vertices of the central bore of the output shaft so that the extended post portion rotates with the output shaft; however, the central post portion does not provide any vertical support by the funnel assembly. Rather, the lower surface of cross piece 390 of the U-shaped channel rests on the inner race 366 of the flanged bearing. Thus, the bearing support bracket 340 and the flanged bearing support the entire weight of the vertical rod assembly 280 and a portion of the weight of the horizontal rod assembly 270 and any meat or other food supported by the horizontal rod assembly. The weight is coupled from the bearing to the bearing support bracket, through the upper standoffs 320, through the frame of the gear drive 312 and through the lower standoffs 322 to the motor support bracket 330. Accordingly, the output shaft of the gearmotor only has to provide rotational torque to the vertical rod assembly and does not have to provide any vertical support for the weight on the vertical rod assembly. Thus, a conventional gearmotor may be used instead of having to modify a gear motor to accommodate the weight on the vertical rod assembly.

The rod-receiving funnel assembly 370 serves as an output coupler for the motor assembly 260. In particular, the funnel assembly rotates in a horizontal plane parallel to the oven floor 216 and couples the rotational energy of the motor assembly to the vertical rod assembly 280 as described below. The funnel assembly is particularly advantageous because the motor assembly is completely hidden below the oven floor. Although a user cannot see the motor assembly, the opening 282 of the funnel assembly is sufficiently large that even if the vertical rod assembly is lowered through the oven floor at an angle to a vertical axis through the oven floor, the lower end of the vertical rod assembly (described in more detail below) is guided by the upper portion of the funnel assembly to cause the lower end of the vertical rod assembly to engage the channel defined by the extended tabs 384, 386.

The vertical rod assembly 280 and the floor bushing assembly 290 are shown in more detail in FIGS. 12-15. The vertical rod assembly comprises a solid cylindrical vertical rod 400 comprising stainless steel. In the illustrated embodiment, the vertical rod has an outer diameter of approximately 0.37 inch. The length of the vertical rod is selected with respect to the position of the motor assembly 260 below the oven floor 216 and the position of the horizontal rod assembly 270 above the oven floor so that the horizontal rod assembly is positioned midway between the oven floor 216 and the top 214 of the oven cavity. For example, in the illustrated embodiment, the vertical rod has a length of approximately 10.46 inches.

The vertical rod 400 has an upper end 402 that is cut to form a substantially flat surface normal to a vertical axis 404 of the vertical rod assembly 280. The vertical rod has a lower end 406 that is rounded in a first plane as shown in FIG. 13 and that is flattened in a second plane normal to the first plane as shown in FIG. 14. In particular, approximately $5/8$ inch of the lower end of the vertical rod is flattened to a thickness of approximately $5/32$ inch so that the lower end of the vertical rod fits within the width W of the channel formed by the first extended tab 384 and the second extended tab 386 of the rod-receiving funnel 370 described above. The lower end is rounded to reduce the friction of the lower end as the lower end moves along the panels of the rod-receiving funnel before dropping into the channel.

The upper end 402 of the vertical rod 400 is inserted into a central bore 412 of a vertical bevel gear 410 that has an upper face 414, a lower face 416 and a plurality of angled teeth (e.g., 32 teeth) 418. The vertical bevel gear comprises the wheel of a miter gear configuration described in more detail below. Preferably, the vertical bevel gear comprises stainless steel.

The central bore 412 of the vertical bevel gear 410 is cylindrical and at least the upper portion of the central bore is sized to receive the outer diameter of the body 422 of a tee bushing 420. The tee bushing has an upper flange 424 that is larger than the central bore of the vertical bevel gear so that the body of the tee bushing is supported by the upper face 414 of the vertical bevel gear. The tee bushing has a central bore 426 that is sized to be slightly larger than the outer diameter of the vertical rod so that the upper end of the vertical rod enters the central bore of the tee bushing and is centered in the central bore of the vertical bevel gear as shown in the cross-sectional views of FIGS. 15 and 18. Preferably, the tee bushing comprises brass or other suitable heat resistant material. In the illustrated embodiment, the central bore of the vertical bevel gear is stepped inward to the smaller diameter of the vertical rod; however, the central bore may be the same diameter throughout.

Figure 15:
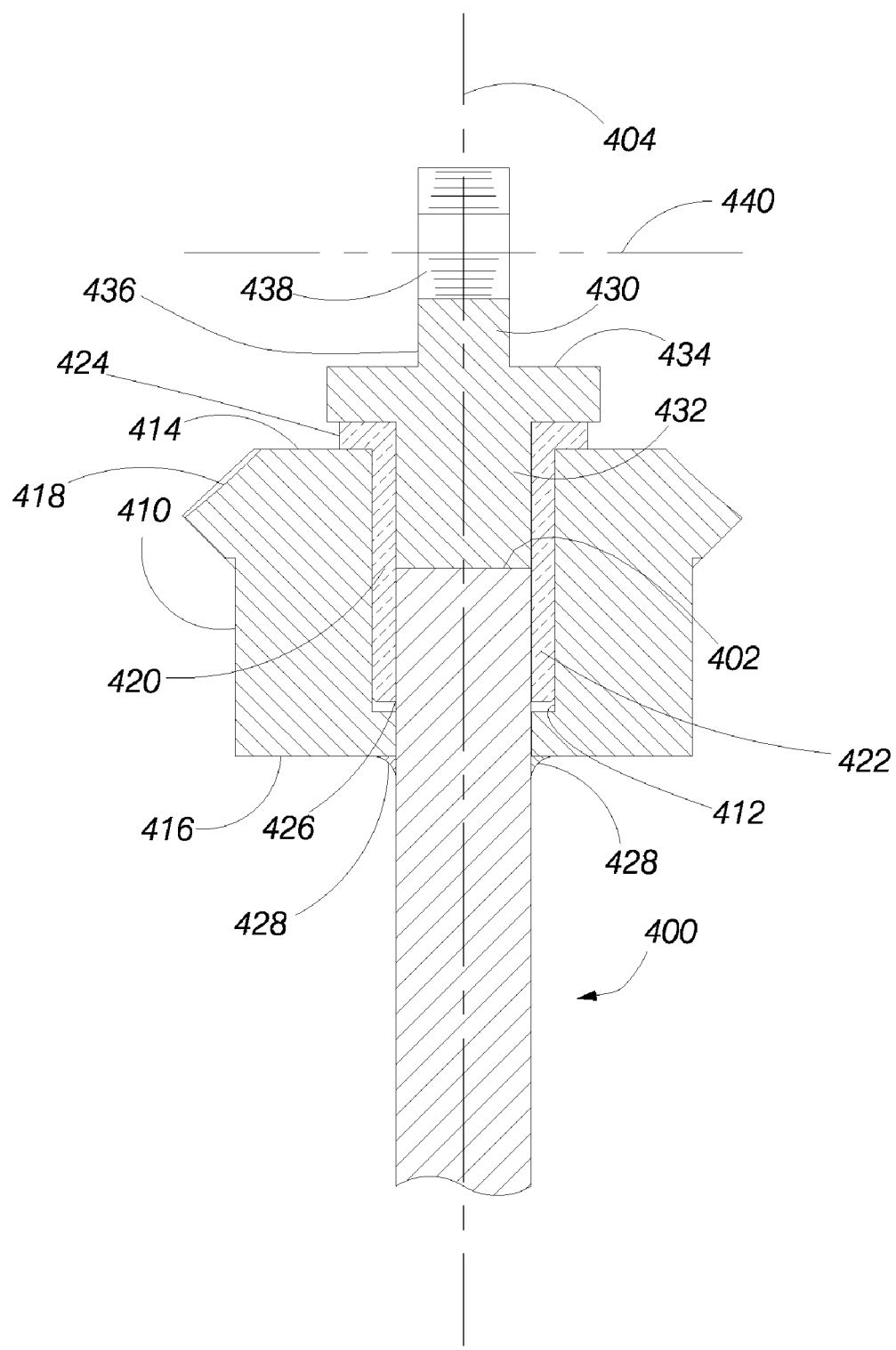
FIG. 15 illustrates an enlarged cross-sectional view of the upper portion of the assembled vertical rod assembly of FIG. 12 to show the placement of the tee bushing in the bevel gear and the placement of the floating horizontal rod bearing in the tee bushing.

As further shown in FIG. 15, the vertical rod 400 is secured to the vertical bevel gear 410 by a plurality of spot welds 428 between the outer circumference of the vertical rod and the lower face 416 of the vertical bevel gear. In an embodiment where the central bore 412 of the vertical bevel gear has a larger diameter than the vertical rod, the spot welds span an annular gap between the vertical rod and the lower face of the vertical bevel gear.

The vertical rod assembly 280 further includes a floating horizontal rod bearing 430. The floating horizontal rod bearing includes a lower cylindrical portion 432 that is sized to fit into the central bore 426 of the tee bushing 420. The lower cylindrical portion supports a flange portion 434 that is positioned above the upper flange 424 of the tee bushing. The flange portion supports a bearing block 436 that has a semicircular bearing surface 438 formed concentric to a horizontal centerline 440 that is perpendicular to the vertical axis 404 through the horizontal rod assembly 280. The bearing block has a thickness along the horizontal centerline of approximately ¼ inch.

When the vertical rod assembly 280 is assembled as shown in the cross-sectional elevation view of FIG. 15, the vertical bevel gear 412 is secured to the vertical rod 400 and rotates with the vertical rod. Although the floating horizontal rod bearing 430 is supported from below by the vertical rod, the horizontal rod bearing is not constrained within the tee bushing 420. Furthermore, the tee bushing is not constrained within the vertical bevel gear. Accordingly, the horizontal rod bearing is decoupled from the rotation of the vertical rod and therefore does not rotate with the vertical rod the vertical bevel gear. In other words, the floating horizontal bearing is rotationally independent of the rotation of the vertical rod. As discussed below, when the horizontal rod assembly 270 is installed in the oven cavity 200, the horizontal centerline 440 through the semicircular bearing surface 438 remains parallel to the front of the oven cavity.

Figure 16:
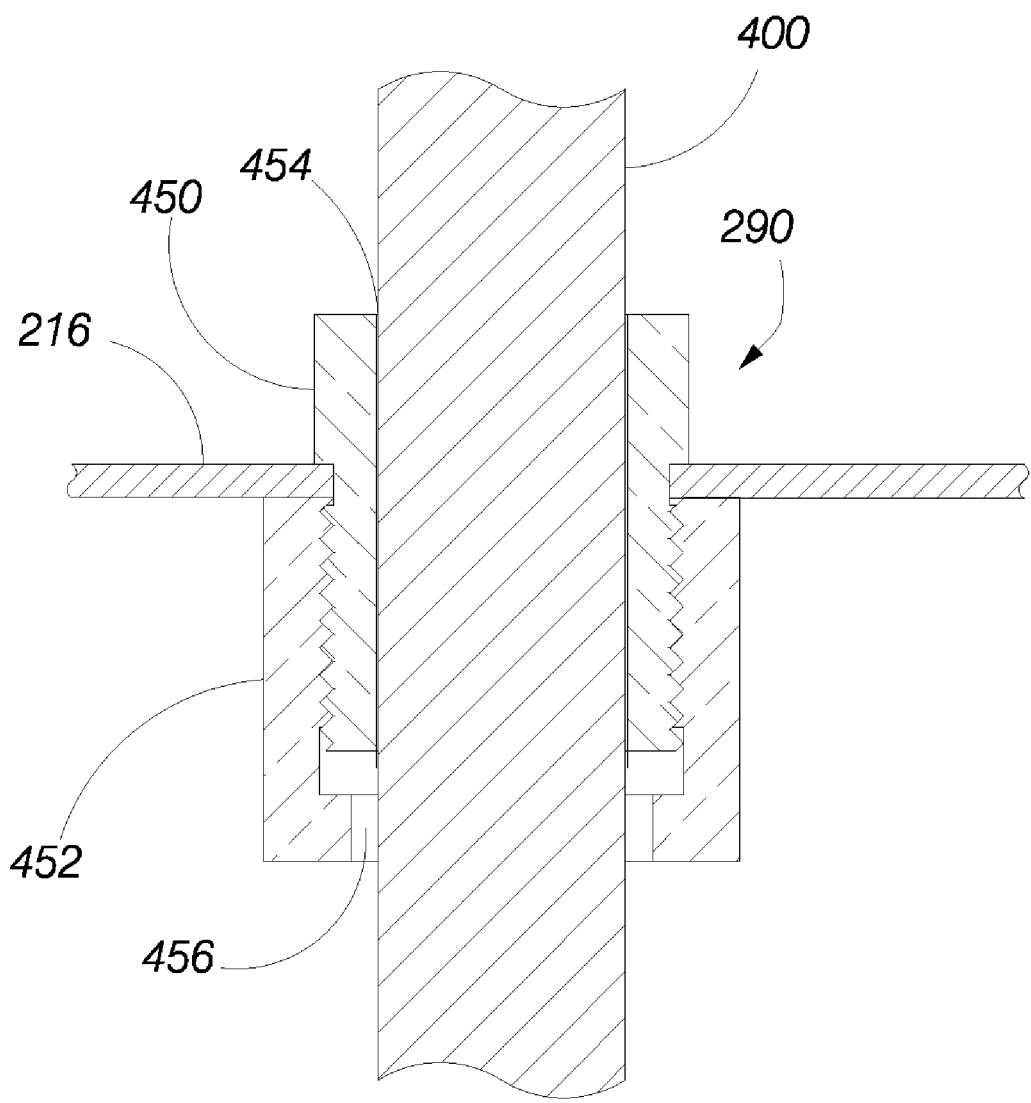
FIG. 16 illustrates an enlarged cross-sectional elevational view of the floor bushing assembly installed in the opening in the oven floor (shown in partial cross section) and showing the vertical rod passing through the central bore of the floor bushing assembly.

As further shown in FIGS. 12 and 16, the floor bushing assembly 290 comprises an upper male threaded portion 450 and a lower female threaded portion 452. The upper male threaded portion has a center bore 454 that has a diameter sized to receive the outer diameter of the vertical rod 400 so that the vertical rod rotates freely within the central bore but with very little lateral movement. For example, in the preferred embodiment, the central bore of the upper male threaded portion has an inside diameter of approximately ⅜ inch. The lower female threaded portion is configured as a nut, such as a nut used on a conventional pipe fitting. The lower end of the female threaded portion has an opening 456 that is at least as large as the central bore of the upper male threaded portion. In the illustrated embodiment, the opening in the lower female threaded portion has a larger diameter than the central bore of the upper male threaded portion.

The outer diameter of the upper male threaded portion 450 of the floor bushing assembly 290 is selected to be substantially the same as the diameter of the hole 240 formed in the floor 216 of the oven cavity 200 so that the upper male threaded portion fits snugly in the hole in the oven floor. As shown in the cross-sectional elevational view in FIG. 16, the upper male threaded portion is inserted through the hole in the oven floor, and the lower female threaded portion is screwed onto the upper male threaded portion. The two portions are tightened to secure the floor bushing assembly to the oven floor.

The floor bushing assembly 290 functions as a guide for installing the vertical rod assembly 280 in the oven cavity 200 and also functions as a bearing surface for the rotating vertical rod 400 when the rotisserie is operating. In the preferred embodiment, the upper male threaded portion 450 and the lower female threaded portion 452 of the bushing assembly comprise brass.

Figure 17:
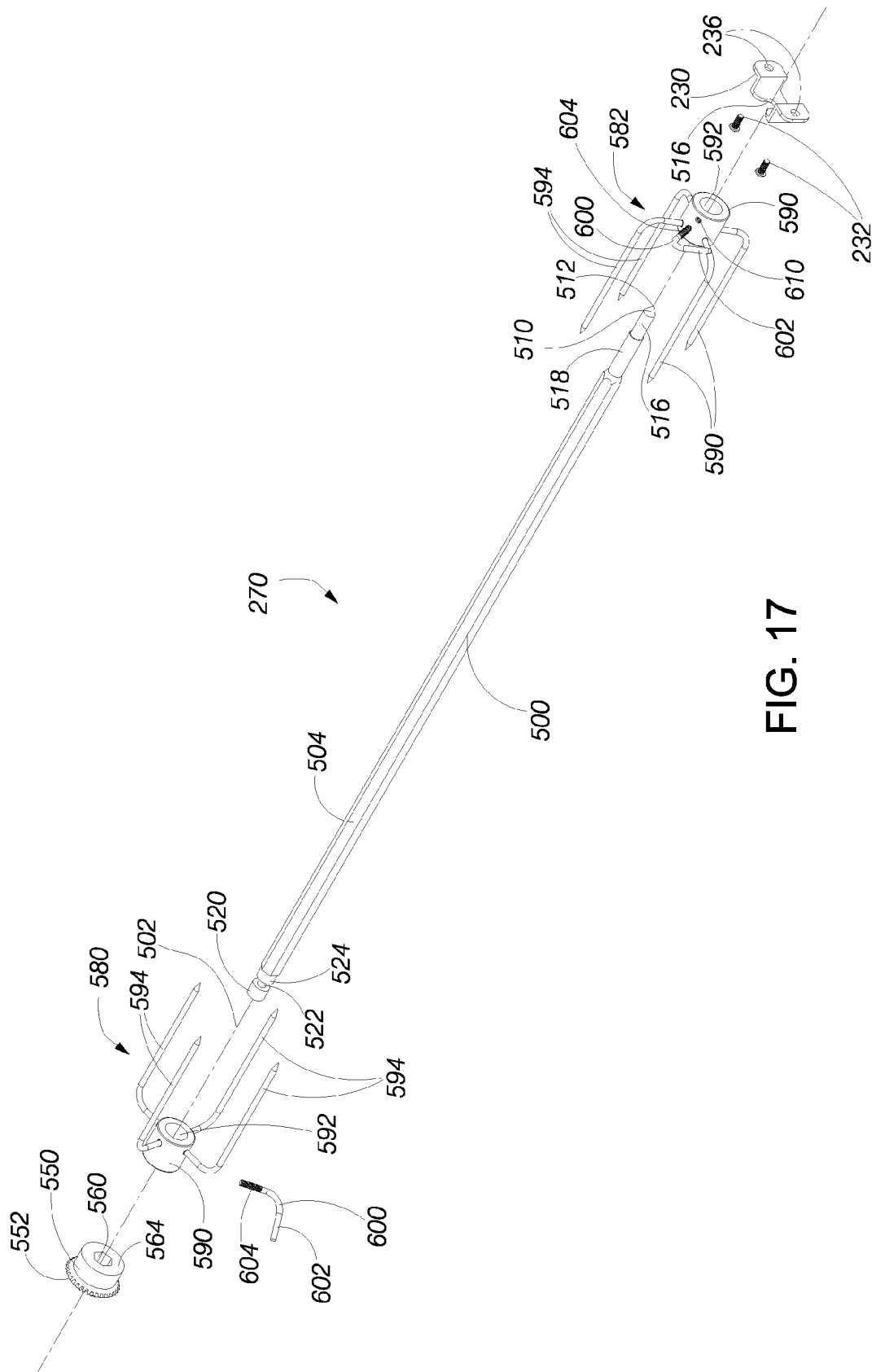
FIG. 17 illustrates an exploded perspective view of the horizontal rod assembly of the rotisserie accessory of FIGS. 5 and 6.

The horizontal rod assembly 270 is shown in more detail in an exploded perspective view in FIG. 17. As illustrated, the horizontal rod assembly includes a horizontal rod 500 that has a length of approximately 26 inches along a horizontal axis 502. The length of the horizontal rod is selected in accordance with the width of the oven cavity 200 in FIGS. 3 and 4. For example, the illustrated oven cavity has a width between the inner surfaces of the left sidewall 210 and the right sidewall 212 of approximately 27 inches.

A main portion 504 of the horizontal rod 500 has a hexagonal cross section, which has a diametrical distance between opposite faces of approximately ½ inch. A rightmost tapered portion 510 of the horizontal rod 500 is machined or otherwise formed into a cone having a circular profile with an increasing diameter from a point 512 at the far right end of the horizontal rod to a base having a diameter of approximately 0.34 inch. The tapered portion has a length along the horizontal axis 502 of approximately ¼ inch. A first right cylindrical portion 514 proximate the cone-shaped portion has a diameter of approximately 0.34 inch and extends for approximately 0.85 inch to the left from the cone-shaped portion. The diameter of the first right cylindrical portion is selected to be slightly smaller than the inner diameter of a curved bearing surface 516 formed in the end support bracket 230. In the illustrated embodiment, a second right cylindrical portion 518 of the hexagonal rod has a diameter of approximately 0.4 inch and extends for approximately 1.4 inches to the left from the first cylindrical portion. The horizontal rod is tapered from the second cylindrical portion to the hexagonal shape of the main portion of the hexagonal rod.

A leftmost portion 520 of the horizontal rod 500 is also machined or otherwise formed into a cylindrical shape. For example, in the illustrated embodiment, the leftmost portion has a length of approximately ⅜ inch and has a diameter of approximately ½ inch. A bearing portion 522 to the right of the leftmost portion is also machined or otherwise formed into a cylindrical shape. The bearing portion has a length of approximately ¼ inch and has a diameter of approximately ¼ inch. The diameter of the bearing portion is selected to be slightly smaller than the diameter of the semicircular bearing surface 438 of the bearing block 436 of the floating horizontal rod bearing 430. The length of the bearing portion along the horizontal axis 502 is selected to be slightly greater than the thickness of the bearing block. A second cylindrical portion 524 forms the right boundary of the bearing portion. The second cylindrical portion has a diameter that generally corresponds to the diameter of the leftmost portion.

Figure 18:
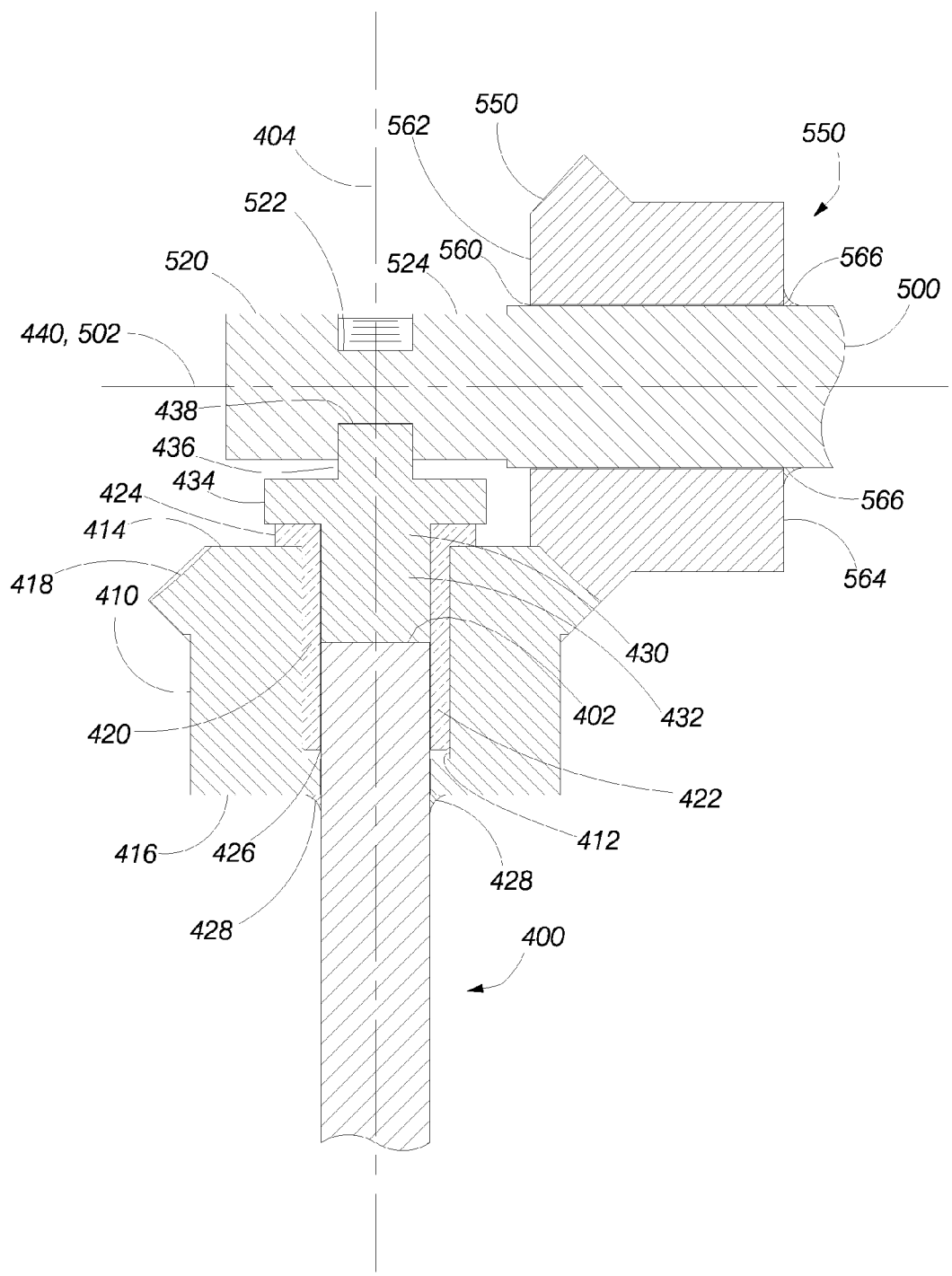
FIG. 18 illustrates an enlarged cross-sectional elevational view of the upper portion of the vertical rod assembly and the leftmost portion of the horizontal rod assembly showing the orthogonal positioning of the vertical bevel gear and the horizontal bevel gear to form a miter gear assembly.

As shown in the cross-sectional view in FIG. 18, the bearing portion 522 of the horizontal rod 500 engages the semicircular bearing surface 438 of the bearing block 436 of the floating horizontal rod bearing 430 when the rotisserie accessory 250 is assembled in the oven cavity 200. The horizontal axis 502 of the horizontal rod is generally aligned with the horizontal axis 440 of the semicircular bearing surface. The relative dimensions of the bearing portion and the semicircular bearing surface are selected so that the bearing portion rotates freely within the bearing block but has little lateral and radial movement with respect to the bearing block.

The horizontal rod assembly 270 further includes a horizontal bevel gear 550 that is positioned on the horizontal rod 500 to the right of the second cylindrical portion 524. In the illustrated embodiment, the horizontal bevel gear has 32 teeth 552, corresponding to the quantity of the teeth 420 of the vertical bevel gear 410, described above. Accordingly, the vertical bevel gear and the horizontal bevel gear may also be considered to be the wheel and pinion, respectively, of a miter gear combination.

In the illustrated embodiment, the horizontal bevel gear 550 has a central bore 560 between a front face 562 (FIG. 18) and a rear face 564. The central bore has a cross section that is sized and shaped to conform to the outer dimensions of the hexagonal horizontal rod 400. Alternatively, the central bore may have a circular cross section that has a diameter that is approximately the same length as the distance between opposing vertices of the hexagonal cross section of the horizontal rod so that the horizontal bevel gear fits snugly on the horizontal rod. In either case, the horizontal bevel gear is secured to the horizontal rod in a suitable manner. For example, in the illustrated embodiment, the rear face of the horizontal bevel gear is welded to the horizontal rod by a plurality of spot welds 566 (FIG. 18).

As shown in the cross-sectional elevation view in FIG. 18, the horizontal bevel gear 550 is positioned on the horizontal rod by a selected distance from the vertical axis 404 of the vertical rod assembly 280 so that the teeth 552 of the horizontal bevel gear mesh with the teeth 420 of the vertical bevel gear 410. Similarly, the vertical bevel gear is positioned with respect to the horizontal axis 502 of the horizontal rod assembly by a similar distance. One skilled in the art will appreciate that the respective mounting locations of the bevel gears depend on the particular configurations of the bevel gears. In general, the two bevel gears are mounted on the respective rods so that the apexes of the respective pitch cones of the bevel gears are substantially coincident with the intersections of the vertical axis and the horizontal axis. For example, in the illustrated embodiment, the two bevel gears are substantially identical except for the bores shaped to accommodate the respective rods. Accordingly, the two faces of the bevel gears are mounted approximately the same distance (e.g., approximately 1 inch) from the intersection of the vertical axis and the horizontal axis.

As further shown in the exploded view of FIG. 17, the horizontal rod assembly 270 includes a first pronged meat hook assembly 580 and a second pronged meat hook assembly 582, which have a conventional configuration. In particular, each pronged meat hook assembly comprises a respective collar 590 that has a respective central bore 592 sized to fit snugly about the horizontal rod 400 but to move freely along the horizontal rod. In the illustrated embodiment, the central bore has a circular cross section that has a diameter slightly greater than the distance between opposing vertices of the hexagonal cross section of the horizontal rod. Alternatively, the central bore may have a hexagonal cross section having dimensions that are slightly larger than the corresponding dimensions of the cross section of the horizontal rod.

Each pronged meat hook assembly 580, 582 has a plurality of prongs 594 that are spaced evenly about the respective collar 590. For example, in the illustrated embodiment, each meat hook assembly includes four prongs. The prongs are bent in a conventional manner so that the ends of the prongs on each collar are directed towards the other collar. A first portion of the each prong extends outwardly from the collar for a selected distance. In the illustrated embodiment, the first portion of each prong extends radially outward from the collar (e.g., generally perpendicular to the horizontal axis 502 of the horizontal rod 500 of the horizontal rod assembly 270. In other embodiments, the first portion of each prong may extend outward at an acute angle with respect to the horizontal axis. A second portion of each prong extends from the first portion and is generally parallel to the horizontal axis. The second portion of each prong ends in a point the enables the prong to be inserted into meat to be cooked on the rotisserie. The prongs are secured to the collar by threaded engagement, by welding or by another suitable method. In the illustrated embodiment, each prong extends for approximately 4⅛ inches from the inward face of the collar toward the other collar. The points of the prong generally lie on a circle (not shown) having a diameter of approximately 3.2 inches.

Each meat hook assembly 580, 582 further includes a respective collar clamp 600 that comprises an L-shaped rod that has a handle portion 602 and a threaded portion 604. The threaded portion engages a threaded hole 610 in the respective collar 590 (shown only for the rightmost collar 582). The threaded portion has a sufficient length that the threaded portion passes through the threaded hole. When the collar is positioned on the horizontal rod 500, torque is applied to the handle portion to rotate the threaded portion until the end of the threaded portion engages the horizontal rod to retain the collar in a selected position on the horizontal rod. As illustrated, the two meat hook assemblies are positioned on the horizontal rod with the respective prongs of the two meat hook assemblies pointed towards the other collar so that the prongs engage the meat on the rotisserie from opposite directions. The two meat hook assemblies may be rotated with respect to each other so that the prongs from each meat hook assembly interleave for shorter pieces of meat.

The rotisserie accessory 250 is quite simple to install and remove from the oven cavity 200. In particular, the meat hook assemblies 580, 582 are positioned and secured on the horizontal rod 500 with the meat skewered on the prongs 594. The vertical rod assembly 280 is positioned in the oven cavity by passing the lower end 406 of the vertical rod 400 through the floor bushing assembly 290 and into the rectangular upper opening 382 of the funnel assembly 370. As described above, the funnel assembly is particularly advantageous because the motor assembly is completely hidden below the oven floor. Although a user cannot see the motor assembly, the opening 282 of the funnel assembly is sufficiently large that even if the vertical rod is lowered through the oven floor at an angle to a vertical axis through the oven floor, the lower end of the vertical rod is guided by the upper portion of the funnel assembly to cause the lower end of the vertical rod assembly to engage the channel defined by the extended tabs 384, 386.

The initial rotational position of the vertical rod 400 is not critical. When the vertical rod engages the funnel assembly 370, the vertical rod is rotated manually to determine whether the lower end has engaged the channel formed between the two tabs 384 386. If engaged, the vertical rod will resist rotation. If not engaged, the curved lower end of the vertical rod will rotate easily along the inner surfaces of the panels 374, 376, 378, 380 of the funnel assembly until the lower end of the vertical rod drops into the channel and resists further rotation. If the user fails to properly engage the lower end of the vertical rod into the channel, the vertical rod will drop into the correct location as soon as the gearmotor is operated.

When the vertical rod assembly 270 is positioned as described above, the vertical rod assembly is inherently stable since the position of the lower end 406 of the vertical rod 400 is fixed in the channel of the funnel assembly 370 and a middle portion of the vertical rod is precluded from lateral movement by the floor bushing assembly 290.

After installing the vertical rod assembly 270, the floating horizontal rod bearing 430 is rotated so that the semicircular bearing surface 438 is positioned to receive the horizontal rod assembly 270. The bearing portion 522 of the horizontal rod 500 is positioned on the semicircular bearing surface. The horizontal rod assembly is then rotated as needed to align the first right cylindrical portion 514 of the horizontal rod with the curved bearing surface 516 of the end support bracket 230.

After the foregoing simple installation steps, the rotisserie accessory is installed and ready to operate. The switch (not shown) for the motor is turned to the "on" position. When the motor rotates, the horizontal rod assembly 270 with the attached meat (not shown) turns at a substantially constant 6 revolutions per minute.

After meat is cooked, the horizontal rod assembly 270 is removed from the oven cavity 200 by simply lifting the horizontal rod assembly from the bearing surfaces at each end. If the rotisserie accessory 250 is not being used to cook additional meat, the vertical rod assembly 280 is also removed from the over cavity so that the oven cavity can be used for conventional backing and roasting using oven racks (not shown) positioned in the left horizontal slots 220 and the right horizontal slots 222.

Since no tools are required to install and remove the rotisserie assembly 250, the vertical rod assembly 280 and the horizontal rod assembly 270 may be easily installed into and removed from the oven cavity 200 even when the oven is hot by using conventional oven gloves. After removal from the oven cavity, the parts of the horizontal rod assembly and the vertical rod assembly may be cleaned by hand or by using a conventional dishwasher. When not in use, the floor bushing assembly 290 in the oven floor 216 may be covered with a cap (not shown).

The rotisserie accessory 250 may be included as part of an original oven system in which case the end support bracket 230 is installed on the right sidewall 212, the opening 240 is formed in the oven floor 216, the floor bushing assembly 290 is secured in the opening, and the motor assembly 280 is positioned beneath the oven floor with the output shaft 314 aligned with the floor bushing assembly as previously described. The horizontal rod assembly 270 and the vertical rod assembly are provided in a package that can be installed when needed in accordance with the previously described steps.

The rotisserie accessory 250 may also be sold as an add-on accessory after an original oven is sold and installed. A template is provided for the oven cavity 200 of a particular oven model to indicate where the 240 hole in the oven floor 216 is positioned and where the mounting holes 234 for the end support bracket 230 are positioned on the right sidewall 212 of the oven cavity. An additional template is provided for positioning the motor assembly 280 beneath the oven floor. The length of the vertical rod assembly 280 and the length of the horizontal rod assembly 270 are selected for particular oven models in accordance with the height of the oven cavity and in accordance with the width of the oven cavity so that the horizontal rod assembly is positioned substantially in the middle of the oven cavity when installed.

One skilled in art will appreciate that the foregoing embodiments are illustrative of the present invention. The present invention can be advantageously incorporated into alternative embodiments while remaining within the spirit and scope of the present invention, as defined by the appended claims.

What is claimed is:

1. A removable rotisserie accessory for an oven comprising:
    a motor assembly positionable beneath a floor of the oven to provide rotational energy about a vertical axis perpendicular to the floor of the oven, the motor assembly including a rotating output coupler that rotates about the vertical axis;
    a bushing assembly positioned through an opening in the oven floor, the bushing assembly aligned with the vertical axis;
    a vertical rod removably insertable through the bushing assembly in the opening in the floor of the oven to engage the output coupler of the motor assembly, the bushing assembly securing the vertical rod in a vertical orientation and enabling the vertical rod to rotate about the vertical axis;
    a horizontal bearing assembly removably positionable at the top of the vertical rod and supported by the vertical rod, the horizontal bearing assembly rotationally decoupled from the vertical rod such that rotation of the vertical rod does not rotate the horizontal bearing assembly, the horizontal bearing assembly including a bearing surface that is concentric with a horizontal axis;
    a horizontal rod having a first end portion removably positioned on and supported by the bearing surface of the horizontal bearing assembly and having a second end portion removably supported by a support structure proximate to a sidewall of the oven, the horizontal rod supporting at least one engagement device for an item to be cooked; and
    a miter gear assembly comprising a first bevel gear mounted on the vertical rod and secured to the vertical rod to rotate with the vertical rod and a second bevel gear mounted on the horizontal rod and secured to the horizontal rod, the second bevel gear removably positioned in engagement with the first bevel gear to rotate the horizontal rod about the horizontal axis in response to rotation of the first bevel gear and the vertical rod about the vertical axis.

2. A removable rotisserie accessory for an oven comprising:
    a motor assembly positionable beneath a floor of the oven to provide rotational energy about a vertical axis perpendicular to the floor of the oven, the rotational energy provided at an output coupler of the motor assembly;
    a vertical rod assembly that includes a vertical rod insertable through an opening in the floor of the oven to engage the motor assembly and to rotate about the vertical axis;
    a horizontal rod having a first end supported by the vertical rod assembly and having a second end supported by a support structure proximate to a sidewall of the oven, the horizontal rod supporting at least one engagement device for an item to be cooked;
    a miter gear assembly comprising a first bevel gear mounted on the vertical rod to rotate with the vertical rod and a second bevel gear mounted on the horizontal rod to rotate the horizontal rod in response to rotation of the first bevel gear; and a funnel assembly coupled to the output coupler of the motor assembly to rotate with the output coupler, the funnel assembly having a lower portion that engages a lower end of the vertical rod to cause the vertical rod to rotate with the funnel assembly, the funnel assembly having an enlarged upper portion that is larger than the lower end of the vertical rod, the enlarged upper portion receiving the lower end of the vertical rod even when the vertical rod is displaced from the vertical axis, the upper portion guiding the lower end of the vertical rod into engagement with the lower portion.

3. The removable rotisserie assembly as defined in claim 2, wherein the enlarged upper portion of the funnel assembly has a substantially rectangular shape.

4. The removable rotisserie assembly as defined in claim 2, wherein:
   the output coupler includes a central bore; and
   the funnel assembly includes an extended lower post, the lower post having a cross-sectional shape selected to engage the central bore of the output coupler of the motor assembly to cause the funnel assembly to rotate with the output coupler.

5. The removable rotisserie assembly as defined in claim 4, wherein the motor assembly further comprises a bearing assembly positioned in alignment with the output coupler, the bearing assembly supporting the weight of the funnel assembly and the weight of the vertical rod, including the weight of any mass supported by the vertical rod.

6. A rotisserie for an oven, the oven having a floor and a pair of sidewalls, the rotisserie comprising:
   a motor positioned beneath the floor of the oven, the motor including an output coupler that provides rotation about a vertical axis;
   a vertical shaft having a lower end that passes through a bearing positioned in an opening in the floor of the oven and that engages the output coupler of the motor to rotate with the output coupler about the vertical axis;
   a floating horizontal bearing having a lower end that is supported by the vertical shaft and that is aligned with the vertical axis, the floating horizontal rotationally decoupled from the vertical shaft such that the floating horizontal bearing remains stationary when the vertical shaft rotates, the floating horizontal bearing having an upper bearing portion having a bearing surface concentric with a horizontal axis;
   a horizontal spit having a horizontal shaft that rotates about the horizontal axis, the horizontal shaft having a first end portion supported by the floating horizontal bearing and having a second end portion supported by a support structure at one of the oven sidewalls; and
   a gear assembly having a first gear secured to the vertical shaft that rotates with the vertical shaft and having a gear secured to the horizontal shaft and that engages the first gear when the first end portion of the horizontal shaft is positioned in the upper bearing portion, the second gear rotating the horizontal shaft about the horizontal axis when the vertical shaft rotates about the vertical axis.

7. A removable rotisserie accessory for an oven comprising:
   a motor assembly positionable beneath a floor of the oven, the motor assembly having an output coupler that rotates about a vertical axis in a horizontal plane generally parallel to the floor of the oven;
   a bushing positioned in an opening in the floor of the oven, the bushing including an inner bearing surface concentric to the vertical axis;
   a vertical rod assembly comprising:
      a vertical rod having a cylindrical outer surface, the vertical rod having a lower end and an upper end, the lower end insertable through the bushing in the opening in the floor of the oven and engageable with the output coupler of the motor assembly so that the vertical rod rotates with is rotated about the vertical axis by the output coupler, the bushing providing a close fit about the cylindrical outer surface of the vertical rod to support the vertical rod in a vertical position aligned with the vertical axis;
      a drive gear proximate to the upper end of the vertical rod, the vertical drive gear mounted on the vertical rod to rotate about the vertical axis when the vertical rod is rotated by the output coupler of the motor assembly; and
      a horizontal bearing support supported by the upper end of the vertical rod, the horizontal bearing support rotationally decoupled from the vertical rod to remain stationary when the vertical rod is rotating below the horizontal bearing support, the horizontal bearing support including a curved bearing support surface having a horizontal axis perpendicular to the vertical axis; and
   a horizontal spit assembly comprising:
      a horizontal rod having a first end portion and a second end portion, the first end portion of the horizontal rod supported by the horizontal bearing support, the horizontal rod having a horizontal axis;
      a driven gear proximate to the first end portion of the horizontal rod, the driven gear engaging the drive gear and rotating the horizontal rod about the horizontal axis in response to rotation of the drive gear about the vertical axis;
      an end support bracket mountable to an inner surface of a sidewall of the oven, the end support bracket supporting the second end portion of the horizontal rod; and
      at least one engaging device mountable on the horizontal rod for engaging an item to be rotated on the horizontal rod assembly.

* * * * *

UNITED STATES PATENT AND TRADEMARK OFFICE
CERTIFICATE OF CORRECTION

PATENT NO.        : 8,272,321 B1
APPLICATION NO.   : 12/027177
DATED             : September 25, 2012
INVENTOR(S)       : Surya Kanwal Kalsi et al.

It is certified that error appears in the above-identified patent and that said Letters Patent is hereby corrected as shown below:

In Column 15 at line 40 (Claim 6 at line 12), replace "floating horizontal rotationally" with --floating horizontal bearing rotationally--;

In Column 16 at line 19 (Claim 7 at line 16), delete "rotates with".

Signed and Sealed this
Sixth Day of November, 2012

David J. Kappos
*Director of the United States Patent and Trademark Office*